United States Patent
Okamatsu et al.

(10) Patent No.: US 9,919,484 B2
(45) Date of Patent: Mar. 20, 2018

(54) CATIONIC NATURAL RUBBER LATEX AND TIRE PUNCTURE SEALANT USING SAME

(71) Applicant: THE YOKOHAMA RUBBER CO., LTD., Minato-ku, Tokyo (JP)

(72) Inventors: Takahiro Okamatsu, Hiratsuka (JP); Hideyuki Takahara, Hiratsuka (JP); Masahiro Naruse, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 143 days.

(21) Appl. No.: 14/651,869

(22) PCT Filed: Dec. 13, 2013

(86) PCT No.: PCT/JP2013/083482
§ 371 (c)(1),
(2) Date: Jun. 12, 2015

(87) PCT Pub. No.: WO2014/092184
PCT Pub. Date: Jun. 19, 2014

(65) Prior Publication Data
US 2015/0321430 A1 Nov. 12, 2015

(30) Foreign Application Priority Data
Dec. 14, 2012 (JP) ................. 2012-273816

(51) Int. Cl.
| | | |
|---|---|---|
| B29C 73/16 | (2006.01) |
| C09K 3/18 | (2006.01) |
| C08K 5/05 | (2006.01) |
| C08L 31/04 | (2006.01) |
| C08L 33/26 | (2006.01) |
| C08C 1/02 | (2006.01) |
| C08K 5/053 | (2006.01) |
| C08L 7/02 | (2006.01) |
| C08L 75/04 | (2006.01) |
| C08L 101/02 | (2006.01) |
| C08G 18/48 | (2006.01) |
| C08G 18/73 | (2006.01) |
| C08G 18/75 | (2006.01) |
| C08G 18/76 | (2006.01) |
| C08G 18/08 | (2006.01) |
| C08G 18/10 | (2006.01) |
| C09D 175/08 | (2006.01) |
| C08G 18/32 | (2006.01) |
| B29L 30/00 | (2006.01) |

(52) U.S. Cl.
CPC .............. *B29C 73/163* (2013.01); *C08C 1/02* (2013.01); *C08G 18/0814* (2013.01); *C08G 18/10* (2013.01); *C08G 18/3275* (2013.01); *C08G 18/4825* (2013.01); *C08G 18/4854* (2013.01); *C08G 18/73* (2013.01); *C08G 18/755* (2013.01); *C08G 18/7621* (2013.01); *C08G 18/7642* (2013.01); *C08G 18/7671* (2013.01); *C08K 5/05* (2013.01); *C08K 5/053* (2013.01); *C08L 7/02* (2013.01); *C08L 31/04* (2013.01); *C08L 33/26* (2013.01); *C08L 75/04* (2013.01); *C08L 101/02* (2013.01); *C09D 175/08* (2013.01); *C09K 3/18* (2013.01); *B29L 2030/00* (2013.01)

(58) Field of Classification Search
CPC ........ B29C 73/163; C08K 5/05; C08K 5/053; C08L 7/02; C08L 33/26; C08L 31/04; C08L 75/04
See application file for complete search history.

(56) References Cited

U.S. PATENT DOCUMENTS

| | | | |
|---|---|---|---|
| 6,462,159 B1 | 10/2002 | Hamada et al. | |
| 2004/0048962 A1 | 3/2004 | Kojima et al. | |
| 2005/0031884 A1 | 2/2005 | Koide et al. | |
| 2011/0201722 A1 | 8/2011 | Takahara et al. | |
| 2012/0041099 A1 | 2/2012 | Takahara | |
| 2013/0172465 A1* | 7/2013 | Okamatsu | B29C 73/163 524/388 |

FOREIGN PATENT DOCUMENTS

| | | |
|---|---|---|
| DE | 60309387 T2 | 9/2007 |
| DE | 112011101806 T5 | 5/2013 |

(Continued)

OTHER PUBLICATIONS

Office Action dated Dec. 15, 2015 issued to the corresponding German Patent Application No. 112013005979.7 and partial English translation.

*Primary Examiner* — Peter D. Mulcahy
(74) *Attorney, Agent, or Firm* — Carrier Blackman & Associates, P.C.; Joseph P. Carrier; Anne G. Sabourin

(57) ABSTRACT

The present invention provides: a cationic natural rubber latex comprising cationic natural rubber microparticles in which the surfaces of natural rubber microparticles are coated by a cationic polymer, a weight average molecular weight of the cationic polymer being from 3000 to 150000, a concentration of the cationic natural rubber being from 30 to 70% by mass, a viscosity at 20° C. being 500 mPa·s or less, and surface potential of the cationic natural rubber microparticles being −3 mV or less; and a tire puncture sealant comprising the cationic natural rubber latex and an acidic resin emulsion, a mass ratio of a solid content of the cationic natural rubber latex to a solid content of the acidic resin emulsion being from 90:10 to 10:90. Such tire puncture sealant has superior puncture-sealing ability, storage stability, and workability.

9 Claims, No Drawings

(56) References Cited

FOREIGN PATENT DOCUMENTS

| JP | 2000-319339 | A | 11/2000 |
|----|-------------|---|---------|
| JP | 2001-081106 | A | 3/2001 |
| JP | 2011-26544 | A | 2/2011 |
| JP | 2011-246610 | * | 8/2011 |
| JP | 2012-057145 | A | 3/2012 |
| WO | 2002/044262 | A1 | 6/2002 |

* cited by examiner

CATIONIC NATURAL RUBBER LATEX AND TIRE PUNCTURE SEALANT USING SAME

TECHNICAL FIELD

The present invention relates to a cationic natural rubber latex and a tire puncture sealant using the same.

BACKGROUND

Nowadays, when a tire used on an automobile or the like is punctured while traveling, the puncture can be repaired by using a tire puncture sealant. As materials constituting the tire puncture sealant, for example, a rubber latex and/or a resin emulsion can be used. To date, the applicant of the present application has proposed a tire puncture sealant of a blend of a natural rubber latex and an ethylene-vinyl acetate copolymerizing emulsion (EVA emulsion) (Patent Document 1).

However, a natural rubber latex, which is typically stabilized using ammonia, has problems due to its strong odor as well as problems of causing allergic symptoms due to proteins in the natural rubber. To solve these problems, a cationic deproteinized natural rubber latex, in which natural rubber is positively charged by using a proteolytic enzyme, a cationic surfactant, and the like for a natural rubber latex, has been proposed (e.g. Patent Document 2).

PRIOR ART DOCUMENT

Patent Document

Patent Document 1: Japanese Unexamined Patent Application Publication No. 2011-26544
Patent Document 2: Japanese Unexamined Patent Application Publication No. 2001-81106

SUMMARY OF THE INVENTION

Problem to be Solved by the Invention

However, for a tire puncture sealant formed from a blend of a natural rubber latex and an acidic resin emulsion such as EVA emulsion, it has been difficult to achieve puncture-sealing ability, storage stability, and workability (that is, having low viscosity at −40° C. and exhibiting excellent squeezability by hand) in a well balanced manner due to low storage stability of the natural rubber, poor mechanical stability (e.g. ease in injecting from a valve), and high viscosity of the blend.

Furthermore, the inventors of the present application have found that, even when a cationic natural rubber latex that has been positively charged using a low molecular weight cationic compound such as a cationic surfactant is merely used in a tire puncture sealant, a tire puncture sealant only having inferior workability and storage stability can be obtained.

An object of the present invention is to provide a tire puncture sealant having excellent puncture-sealing ability, storage stability, and workability (that is, having low viscosity at −40° C. and exhibiting excellent squeezability by hand; the same applies hereinafter).

Means to Solve the Problem

As a result of diligent research to solve the above problems, the present inventors have found that a composition comprising a cationic natural rubber latex described below and an acidic resin emulsion, in a manner that a mass ratio of a solid content of the cationic natural rubber latex to a solid content of the acidic resin emulsion is from 90:10 to 10:90, can be a tire puncture sealant having excellent puncture-sealing ability, storage stability, and workability. The cationic natural rubber latex comprising cationic natural rubber microparticles in which the surfaces of natural rubber microparticles are coated by cationic polymers, a weight average molecular weight of the cationic polymers being from 3000 to 150,000, a concentration of the cationic natural rubber being from 30 to 70% by mass, a viscosity at 20° C. being 500 mPa·s or less, and surface potential of the cationic natural rubber microparticles being −3 mV or less. Therefore, the present inventors have completed the present invention.

That is, the present invention provides the following cationic natural rubber emulsion and the following tire puncture sealant using the same.

1. A cationic natural rubber latex comprising cationic natural rubber microparticles in which surfaces of natural rubber microparticles are coated by a cationic polymer,
   a weight average molecular weight of the cationic polymer being from 3000 to 150,000,
   a concentration of the cationic natural rubber being from 30 to 70% by mass,
   a viscosity at 20° C. being 500 mPa·s or less, and
   a surface potential of the cationic natural rubber microparticles being −3 mV or less.
2. The cationic natural rubber latex according to 1 above, wherein the cationic polymer is a polyurethane having a cationic group and/or a salt thereof.
3. The cationic natural rubber latex according to 1 or 2 above, wherein the cationic polymer has a cationic group and/or a salt, and a monomer used for introducing the cationic group is from 5 to 50 mol % of a total amount of monomers used in a production of the cationic polymer.
4. The cationic natural rubber latex according to any one of 1 to 3 above, wherein the cationic natural rubber latex is produced by using from 1 to 15 parts by mass of the cationic polymer per 100 parts by mass, in terms of solid content, of the natural rubber latex.
5. A tire puncture sealant comprising: the cationic natural rubber latex described in any one of 1 to 4 above; and an acidic resin emulsion, a mass ratio of a solid content of the cationic natural rubber latex to a solid content of the acidic resin emulsion being from 90:10 to 10:90.
6. The tire puncture sealant according to 5 above, wherein the acidic resin emulsion is an ethylene-vinyl acetate copolymer emulsion.
7. The tire puncture sealant according to 5 or 6 above, wherein a total of the solid content of the cationic natural rubber latex and the solid content of the acidic resin emulsion is from 20 to 40% by mass of a total mass of the tire puncture sealant.
8. The tire puncture sealant according to any one of 5 to 7 above, further comprising an antifreezing agent, wherein an amount of the antifreezing agent is from 160 to 400 parts by mass per 100 parts by mass total of a solid content of the natural rubber latex and the solid content of the acidic resin emulsion.
9. The tire puncture sealant according to 8 above, wherein the antifreezing agent is one type or two or more types selected from the group consisting of ethylene glycol, propylene glycol, glycerin, and diethylene glycol.

Effect of the Invention

The cationic natural rubber latex of the present invention can provide a tire puncture sealant having excellent puncture-sealing ability, storage stability, and workability.

The tire puncture sealant of the present invention has excellent puncture-sealing ability, storage stability, and workability.

BEST MODE FOR CARRYING OUT THE INVENTION

The present invention is described in detail below.

The cationic natural rubber latex of the present invention is a cationic natural rubber latex comprising cationic natural rubber microparticles in which surfaces of natural rubber microparticles are coated by a cationic polymer, a weight average molecular weight of the cationic polymer being from 3000 to 150000, a concentration of the cationic natural rubber being from 30 to 70% by mass; a viscosity at 20° C. being 500 mPa·s or less, and a surface potential of the cationic natural rubber microparticles being −3 mV or less.

The cationic natural rubber latex of the present invention comprises cationic natural rubber microparticles in which the surfaces of natural rubber microparticles are coated by a cationic polymer.

The cationic natural rubber needs to have a cationic polymer on its surface. For example, on the entire surface or a part of the surface of the cationic natural rubber may be coated by the cationic polymer. A form of the cationic natural rubber latex is exemplified by colloid protected by a cationic polymer.

The cationic natural rubber latex of the present invention can exhibit excellent storage stability of the cationic natural rubber in the latex and can maintain its storage stability even when the cationic natural rubber is mixed with an acidic resin emulsion since the surface of the natural rubber microparticles is coated by a cationic polymer.

The natural rubber latex used in the production of the cationic natural rubber latex of the present invention is not particularly limited. Examples thereof include conventionally known natural rubber latexes. The natural rubber latex may be stabilized by ammonia or the like. Furthermore, the natural rubber latex may be a deproteinized natural rubber latex. One preferable aspect thereof is a natural rubber latex that has been subjected to an ammonia removal treatment, for example, by heating. Specifically, for example, ammonia in the latex can be reduced to substantially 0% by heating the natural rubber latex at 60° C. for 10 hours.

The cationic polymer used in the production of the cationic natural rubber latex of the present invention is not particularly limited as long as it is a cationic polymer.

Examples of the cationic polymer include primary ammonium cations, secondary ammonium cations, tertiary ammonium cations, quarternary ammonium cations, and salts thereof.

Examples of the cationic polymer include polymers having a structure of a cationic group or a salt thereof.

Examples of the cationic group include groups having a nitrogen atom, and specific examples thereof include ammonium cations and salts thereof.

The ammonium cation as the cationic group is not particularly limited as long as the ammonium cation is a cationic group having $N^+$ bonded to at least one hydrocarbon group (e.g. main chain of the polymer).

The counterion that forms a salt with the cation (e.g. represented as $X^{n-}$, wherein n is an integer of 1 or greater) is not particularly limited. Examples thereof include halogen ions (such as chlorine, bromine, and iodine), hydroxide ions, nitrate ions, nitrite ions, and sulfate ions.

The cationic group may be directly bonded to the main chain of the polymer or may be bonded to the main chain of the polymer via an organic group (e.g. divalent hydrocarbon group that may have a hetero atom such as an oxygen atom, nitrogen atom, or sulfur atom).

In addition to be bonded to the main chain of the polymer, the cationic group can be bonded to another organic group. The organic group is not particularly limited. Examples thereof include hydrocarbon groups that may have a hetero atom such as an oxygen atom, nitrogen atom, and sulfur atom. The cation may be bonded to the hydrocarbon group, for example, via a hetero atom such as an oxygen atom, nitrogen atom, and sulfur atom. The hydrocarbon group is not particularly limited. Examples thereof include aliphatic hydrocarbon groups (which may be linear or branched, and may have an unsaturated bond), cycloaliphatic hydrocarbon groups (which may have an unsaturated bond), aromatic groups, and a combination of these. For cases where two or more organic groups are present, the two organic groups may bond each other to form a cyclic structure. Examples of the aliphatic hydrocarbon group include alkyl groups such as a methyl group.

The cationic group needs to be introduced to at least one of a side chain, terminal, or main chain of the polymer.

The main chain of the polymer is not particularly limited. Examples thereof include polyurethane (including urethane prepolymer), polyvinylpyrrolidone, conductive polymers (such as polyaniline and polypyrrole), polyethyleneimine, polyvinylamine, polyallylamine, and polyacrylamide.

The cationic group is exemplified by at least one type of cationic group selected from the group consisting of —$N^+H_aR_{3-a}$ (wherein a is an integer of 0 to 3; R is a hydrocarbon group; and when there is a plurality of R moieties, the plurality of R moieties may bond each other to form a cyclic structure), >$N^+H_bR_{2-b}$ (wherein b is an integer of 0 to 2; R is a hydrocarbon group; and when there is a plurality of R moieties, the plurality of R moieties may bond each other to form a cyclic structure. Note that >$N^+H_bR_{2-b}$ represents divalency), ≡$N^+H_cR_{1-c}$ (c is 0 or 1; and R is a hydrocarbon group. Note that ≡$N^+H_cR_{1-c}$ represents trivalency), quaternary ammonium cations, and salts of these.

The hydrocarbon groups are the same as those described above.

When the cationic group is —$N^+H_aR_{3-a}$, —$N^+H_aR_{3-a}$ may be bonded to the polymer main chain at a terminal and/or in a side chain.

When the cationic group is >$N^+H_bR_{2-b}$, ≡$N^+H_cR_{1-c}$, or a quaternary ammonium cation, the cationic group may be introduced to a terminal, side chain, or main chain of the polymer.

When the cation has $N^+$, the salt thereof is a salt of an ammonium cation: $N^+X^-$. X is not particularly limited, and examples of X include halogens (such as chlorine, bromine, and iodine), and a hydroxy group.

Examples of the cationic polymer include polyurethane having a cationic group and/or a salt thereof, and polyvinylpyrrolidone having at least a cationic group and/or a salt thereof in a side chain.

Of these, from the perspective of exhibiting superior puncture-sealing ability, storage stability, and workability, the cationic polymer is preferably polyurethane having a cationic group and/or a salt thereof, and more preferably polyurethane having, as a cationic group, an ammonium cation and/or a salt thereof. The cationic group and/or the salt thereof needs to be introduced to at least one of a side chain, terminal, or main chain of the polyurethane.

The polyurethane having a cationic group and/or a salt thereof is not particularly limited. Examples thereof include conventionally known methods. Specific examples thereof include polyurethane having, as a cationic group, an ammonium cation and/or a salt thereof at at least one of side chain, terminal, or main chain.

The method of producing polyurethane as the cationic polymer is not particularly limited. For example, polyurethane having an ammonium cation salt can be produced by producing a urethane prepolymer in which an amino group (including an amino group in which one or two of hydrogen atoms of —NH$_2$ have been removed) is introduced to at least one of side chain, side chain, or main chain obtained by reacting an amine compound having two or more hydroxy groups, polyisocyanate, and polyol (except for an amine compound having two or more hydroxy groups), and then adding a neutralizer such as hydrochloric acid. The amine compound having two or more hydroxy groups is used as a monomer for introducing the cationic group into the polyurethane.

The amine compound having two or more hydroxy groups that is used as the cationic polymer during the production of the polyurethane is not particularly limited. The amine compound may be a primary amine, secondary amine, or tertiary amine. The amine compound may have one or two or more of at least one type of amino group selected from the group consisting of —NH$_2$, —NH—, and a group represented by:

Formula 1

The amino group and a hydroxy group may be bonded via, for example, a hydrocarbon group that may have a hetero atom such as an oxygen atom, nitrogen atom, or sulfur atom. Examples of the hydrocarbon group include aliphatic hydrocarbon groups (which may be linear or branched, and may have an unsaturated bond), cycloaliphatic hydrocarbon groups (which may have an unsaturated bond), aromatic groups, and a combination of these.

Examples of the amine compound having two or more hydroxy groups include N-methyldiethanolamine and diethanolamine.

The polyisocyanate that is used as the cationic polymer during the production of the polyurethane is not particularly limited. Examples thereof include aliphatic polyisocyanates (that may contain a cycloaliphatic hydrocarbon group) such as hexamethylene diisocyanate and isophorone diisocyanate; and aromatic polyisocyanates such as toluene diisocyanate, xylylene diisocyanate, and diphenylmethane diisocyanate.

The polyol that is used as the cationic polymer during the production of the polyurethane is not particularly limited. For example, from the perspectives of exhibiting excellent storage stability and excellent sealing performance, examples thereof include aliphatic polyester polyols such as hexane diol adipate and butane diol adipate; aromatic polyester polyols such as polyethylene terephthalate; polyether polyols such as polyoxypropylene polyol, poly(propylene glycol), and poly(tetramethylene glycol).

For cases where the cationic polymer forms a salt, an acid (neutralizer) that is used to form the salt is not particularly limited. Examples thereof include hydrochloric acid, acetic acid, and phosphoric acid.

The amount of the monomer used to introduce the cationic group is, from the perspective of exhibiting excellent puncture-sealing ability, storage stability, and workability, from 5 to 50 mol %, and more preferably from 10 to 40 mol %, of the total amount of the monomers used in the production of the cationic polymer.

The amount of the monomer used to introduce the cationic group to the polyurethane is, from the perspective of exhibiting excellent puncture-sealing ability, storage stability, and workability, from 5 to 50 mol %, and more preferably from 10 to 40 mol %, of the total amount of the monomers used in the production of the polyurethane.

In the cationic natural rubber latex of the present invention, the weight average molecular weight of the cationic polymer is from 3,000 to 150,000. When the weight average molecular weight of the cationic polymer is 3,000 or greater, the storage stability of the tire puncture sealant obtained by using the cationic natural rubber latex of the present invention will be excellent. When the weight average molecular weight of the cationic polymer is 150,000 or less, the viscosity of the cationic natural rubber latex and the surface potential of the cationic natural rubber microparticles of the present invention will be suitable, and thus the workability of the tire puncture sealant obtained by using the cationic natural rubber latex will be excellent.

The weight average molecular weight of the cationic polymer is, from the perspective of exhibiting excellent puncture-sealing ability, storage stability, and workability, preferably from 50,000 to 150,000, and more preferably from 100,000 to 150,000. The weight average molecular weight of the cationic polymer is determined in terms of polystyrene by gel permeation chromatography (GPC) using dimethylformamide as a solvent.

A single or a combination of two or more types can be used as the cationic polymer.

The method of producing the cationic polymer is not particularly limited. Examples thereof include conventionally known methods.

Examples of the production method of the cationic natural rubber latex of the present invention include a production method in which a natural rubber latex and a cationic polymer are mixed.

The amount of the cationic polymer that is used is, from the perspective of exhibiting excellent puncture-sealing ability, storage stability, and workability, preferably from 1 to 15 parts by mass, and more preferably from 3 to 12 parts by mass, per 100 parts by mass, in terms of solid content, of the natural rubber latex.

The cationic polymer used in the production of the cationic natural rubber latex of the present invention needs to cover all or a part of the surface of the natural rubber microparticles.

At least a part or all of the surface of the natural rubber microparticles needs to be covered by the cationic polymer.

The cationic natural rubber latex of the present invention may also contain a cationic polymer that is not covering a surface of the natural rubber microparticles and/or natural rubber microparticles that have not been covered with the cationic polymer, in addition to the cationic natural rubber microparticles.

In the cationic natural rubber latex of the present invention, the concentration of the cationic natural rubber is from 30 to 70% by mass.

The concentration of the cationic natural rubber of the cationic natural rubber latex is, from the perspective of exhibiting excellent puncture-sealing ability, storage stability, and workability, preferably from 40 to 70% by mass.

The cationic natural rubber latex of the present invention has a viscosity at 20° C. of 500 mPa·s or less.

The viscosity at 20° C. of the cationic natural rubber latex of the present invention is, from the perspective of exhibiting excellent puncture-sealing ability, storage stability, and workability, preferably from 50 to 400 mPa·s, and more preferably from 100 to 380 mPa·s.

The surface potential of the cationic natural rubber microparticles contained in the cationic natural rubber latex of the present invention is −3 mV or less. When the surface potential of the cationic natural rubber microparticles contained in the cationic natural rubber latex of the present invention is −3 mV or less, it is proved that the cationic natural rubber latex of the present invention contains cationic natural rubber microparticles in which the surface of the natural rubber microparticles is coated with a cationic polymer.

The surface potential of the cationic natural rubber microparticles contained in the cationic natural rubber latex of the present invention is, from the perspective of exhibiting excellent puncture-sealing ability, storage stability, and workability, preferably from −10 to −50 mV, and more preferably from −15 to −50 mV.

Examples of the method of using the cationic natural rubber latex of the present invention include a method in which the cationic natural rubber latex is mixed with an acidic resin emulsion and used as a tire puncture sealant.

The tire puncture sealant of the present invention will be described below.

The tire puncture sealant of the present invention is a tire puncture sealant comprising: the cationic natural rubber latex of the present invention; and an acidic resin emulsion, a mass ratio of a solid content of the cationic natural rubber latex to a solid content of the acidic resin emulsion being from 90:10 to 10:90.

The cationic natural rubber latex used in the tire puncture sealant of the present invention is not particularly limited as long as the cationic natural rubber latex is the cationic natural rubber latex of the present invention. The cationic natural rubber latex can be used alone or as a combination of two or more types of cationic natural rubber latex.

The acidic resin emulsion used in the tire puncture sealant of the present invention is not particularly limited.

Examples of the acidic resin emulsion include ethylene-vinyl acetate copolymer emulsions, vinyl acetate emulsions, and ethylene-vinyl acetate-vinyl versatate copolymers. Among these, from the perspective of exhibiting excellent puncture-sealing ability, storage stability, and workability, ethylene-vinyl acetate copolymer emulsions are preferable.

The pH of the acidic resin emulsion is, from the perspective of exhibiting excellent puncture-sealing ability, storage stability, and workability, preferably from 2.5 to 6.5, and more preferably from 3.5 to 6.5.

The acidic resin emulsion can be used alone or as a combination of two or more types of acidic resin emulsions.

In the tire puncture sealant of the present invention, the mass ratio of the solid content of the cationic natural rubber latex to the solid content of the acidic resin emulsion (solid content of the cationic natural rubber latex:solid content of the acidic resin emulsion) is from 90:10 to 10:90. From the perspective of exhibiting excellent puncture-sealing ability, storage stability, and workability, this mass ratio is preferably from 80:20 to 20:80, and more preferably from 30:70 to 70:30.

The total of the solid content of the cationic natural rubber latex and the solid content of the acidic resin emulsion is, from the perspective of exhibiting excellent puncture-sealing ability, storage stability, and workability, preferably from 20 to 40% by mass, and more preferably from 25 to 40% by mass, of the total mass of the tire puncture sealant.

The tire puncture sealant of the present invention can further comprise an antifreezing agent. When the tire puncture sealant of the present invention further comprises an antifreezing agent, its storage stability will be superior.

From the perspective of exhibiting excellent puncture-sealing ability, storage stability, and workability, the antifreezing agent is preferably one type or two or more types selected from the group consisting of ethylene glycol, propylene glycol, glycerin, and diethylene glycol.

The amount of the antifreezing agent is, from the perspective of exhibiting excellent puncture-sealing ability, storage stability, and workability, preferably from 160 to 400 parts by mass, and more preferably from 200 to 350 parts by mass, per 100 parts by mass total of the solid content of the natural rubber latex and the solid content of the acidic resin emulsion.

In addition to the components described above, the tire puncture sealant of the present invention can optionally contain additives such as tackifiers, fillers, antiaging agents, antioxidants, pigments (dyes), plasticizers, thixotropic agents, UV absorbents, flame retardants, dispersants, dehydrating agents, and antistatic agents.

The method of producing the tire puncture sealant of the present invention is not particularly limited. Examples of the method include a production method in which a cationic natural rubber latex, an acidic resin emulsion, and an antifreezing agent and an additive that may be optionally used are placed in a container, and then the mixture is mixed under reduced pressure using a mixer such as a blending mixer.

The method of using the tire puncture sealant of the present invention is not particularly limited. Examples thereof include conventionally known methods.

The tire puncture sealant of the present invention can be used as, for example, a tire puncture repair fluid for temporary repairs that can be squeezed by hand.

EXAMPLES

The present invention is described below in detail using working examples. However, the present invention is not limited to such working examples.

<Production of Cationic Polymer>

Components described in the following tables were used at amounts (unit: mol) described in the same tables. These components were heated at 70° C. for 8 hours, stirred, and polymerized to produce a urethane prepolymer in which a nitrogen atom was introduced to a main chain. To the urethane prepolymer, hydrochloric acid, as a neutralizer, was added at an amount described in the same table to produce polyurethane having a salt of an ammonium cation, as a cationic polymer. These polymerization examples are referred to as Polymerization Examples 1 to 26. Polymerization Examples 16, 17, 21, 22, and 24 to 26 were used for comparative examples.

<Molecular Weight of Cationic Polymer>

Weight average molecular weights of the cationic polymers obtained in the above described polymerization examples were measured. The weight average molecular weight of the cationic polymer was determined in terms of polystyrene by gel permeation chromatography (GPC) using dimethylformamide as a solvent. The results are shown in the tables.

PPG2000: poly(propylene glycol), weight average molecular weight: 2000, manufactured by Sanyo Chemical Industries, Ltd.

TABLE 1

| | | Mw | Polymerization Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Isocyanate | TDI | 174 | 1 | ← | ← | ← | ← | ← | | | | | | | |
| | MDI | 250 | | | | | | | 1 | 1 | | | | | |
| | XDI | 188 | | | | | | | | | 1 | | | | |
| | IPDI | 222 | | | | | | | | | | 1 | 1 | | |
| | HDI | 168 | | | | | | | | | | | | 1 | 1 |
| Cation component | N-methyldiethanolamine | 119 | 0.03 | 0.05 | 0.1 | 0.3 | 0.5 | 0.7 | 0.05 | 0.3 | 0.5 | 0.1 | 0.4 | 0.04 | 0.5 |
| | Diethanolamine | 105 | | | | | | | | | | | | | |
| | Hydrochloric acid | 36.50 | 0.033 | 0.053 | 0.12 | 0.32 | 0.55 | 0.71 | 0.053 | 0.33 | 0.51 | 0.13 | 0.41 | 0.04 | 0.54 |
| Diol | PPG1000 | 1000 | 0.75 | ← | ← | ← | ← | ← | ← | ← | ← | ← | ← | ← | ← |
| Cationic polymer | Molecular weight (Mw = each value × 1000) | | 56 | 58 | 55 | 59 | 52 | 52 | 50 | 61 | 54 | 53 | 57 | 53 | 55 |

TABLE 2

| | | Mw | Polymerization Examples | | | | | | | | | | | | | |
|---|---|---|---|---|---|---|---|---|---|---|---|---|---|---|---|---|
| | | | 3 | 14 | 15 | 16 | 17 | 18 | 19 | 20 | 21 | 22 | 23 | 24 | 25 | 26 |
| Iso-cya-nate | TDI | 174 | 1 | ← | ← | ← | ← | ← | ← | ← | ← | | | | | |
| | MDI | 250 | | | | | | | | | | | | | | |
| | XDI | 188 | | | | | | | | | | | | | | |
| | IPDI | 222 | | | | | | | | | | 1.0 | ← | ← | ← | ← |
| | HDI | 168 | | | | | | | | | | | | | | |
| Cat-ion com-po-nent | N-methyl-diethanolamine | 119 | 0.1 | ← | ← | ← | ← | ← | ← | ← | ← | | | | | |
| | Diethanolamine | 105 | | | | | | | | | | 0.2 | ← | ← | ← | ← |
| | Hydrochloric acid | 36.50 | 0.12 | ← | ← | ← | ← | ← | ← | ← | ← | 0.21 | ← | ← | ← | ← |
| Diol | PPG1000 | 1000 | 0.75 | | | | | | | | | | | | | |
| | PPG2000 | 2000 | | 0.75 | 0.85 | 0.95 | | | | | | | | | | |
| | PTMG1000 | 1000 | | | | | 0.15 | 0.75 | 0.8 | 0.84 | 0.95 | | | | | |
| | 1,4BDAA1000 | 1000 | | | | | | | | | | 0.2 | 0.7 | 0.82 | 0.88 | 0.92 |
| | | | 55 | 98 | 134 | 170 | 2.2 | 52 | 77 | 145 | 200 | 2.8 | 100 | 152 | 189 | 234 |
| Cat-ionic poly-mer | Molecular weight (Mw = each value × 1000) | | 55 | 98 | 134 | 170 | 2.2 | 52 | 77 | 145 | 200 | 2.8 | 100 | 152 | 189 | 234 |

The details of each component shown in the above tables are as follows.

TDI: toluene diisocyanate, manufactured by Wako Pure Chemical Industries, Ltd.
MDI: diphenylmethane diisocyanate, manufactured by Mitsui Toatsu Chemicals
XDI: xylene diisocyanate, manufactured by Wako Pure Chemical Industries, Ltd.
IPDI: isophorone diisocyanate, manufactured by Wako Pure Chemical Industries, Ltd.
HDI: hexamethylene diisocyanate, manufactured by Wako Pure Chemical Industries, Ltd.
N-methyldiethanolamine: manufactured by Wako Pure Chemical Industries, Ltd.
Diethanolamine: manufactured by Wako Pure Chemical Industries, Ltd.
Hydrochloric acid: reagent
PPG1000: poly(propylene glycol), weight average molecular weight: 1000, manufactured by Sanyo Chemical Industries, Ltd.
PTMG1000: poly(tetramethylene glycol), weight average molecular weight: 1000, manufactured by Sanyo Chemical Industries, Ltd.
1,4BDAA1000: polyester polyol of 1,4-butane diol and adipic acid, weight average molecular weight: 1000, manufactured by Adeka Corporation <Production of Cationic Natural Rubber Latex>

NR latexes and cationic polymers described in the following tables were used at amounts (unit: part by mass) described in the same tables. These components were stirred and mixed at 20° C. to obtain cationic natural rubber latexes. The concentrations of the cationic natural rubbers in the obtained cationic natural rubber latexes were all 62.3% by mass.

The NR latex used in the production of the cationic natural rubber latex was heated in advance at 60° C. to remove ammonia contained in the NR latex. In Table 3, the viscosity of Blending Example 1 is a viscosity of natural rubber latex after removing ammonia; and the surface potential of Blending Example 1 is a surface potential of natural rubber microparticles.

<Evaluation of Cationic Natural Rubber Latex>

The following evaluations were performed for the cationic natural rubber latex obtained as described above. The results are shown in the tables.

Viscosity

The viscosity of the cationic natural rubber latex obtained as described above was measured using a BH-type viscometer at 20° C.

Surface Potential of Cationic Natural Rubber Microparticles

The cationic natural rubber latex obtained as described above was diluted with distilled water in a manner that the concentration of the cationic natural rubber in the cationic natural rubber latex was lowered from 62.3% by mass to 10% by mass. By measuring the obtained diluted liquid via ELS-Z (manufactured by Otsuka Electronics Co., Ltd.) using the dynamic light scattering method, the surface potential of the cationic natural rubber microparticles contained in the cationic natural rubber latex was obtained.

<Production of Tire Puncture Sealant>

In the total amount of the cationic natural rubber latex obtained as described above, an EVA Em (EVA emulsion) and antifreezing agent(s) described in tables below were added at amounts (unit: part by mass) described in the same table, and mixed to produce a tire puncture sealant.

<Evaluation of Tire Puncture Sealant>

The following evaluations were performed for the tire puncture sealants obtained as described above. The results are shown in the tables.

Safety (pH)

The pH of the tire puncture sealant obtained as described above was measured using a pH meter.

Workability

The viscosity at −40° C. of the tire puncture sealant obtained as described above was measured using a BH-type viscometer. When the viscosity of the tire puncture sealant at −40° C. is 1500 mPa·s or less, the tire puncture sealant can be evaluated as a tire puncture sealant having excellent workability at low temperatures.

Furthermore, squeezability by hand was also evaluated by injecting the tire puncture sealant into a tire from a valve (diameter: approximately 6 mm) by squeezing a 600 mL tire puncture sealant packed in a polyethylene container with a polyethylene tube (diameter: approximately 7 mm) by hand at −20° C.

The evaluation criteria of the squeezability by hand are as follows. When all of the tire puncture sealant was injected within 10 minutes, the squeezability was evaluated as " "; and when all of the tire puncture sealant was not injected within 10 minutes, the squeezability was evaluated as "x".

Storage Stability (Vibration Test at 80° C.)

The obtained tire puncture sealant was placed in a container. After the air in the container was purged with nitrogen gas, the container was sealed.

This container was subjected to vibration at a frequency of 20 Hz and an amplitude of ±3 mm, at 80° C. for 7 days.

After the vibration test, the tire puncture sealant was visually observed. Cases where no aggregation was observed in the tire puncture sealant were evaluated as " ", and cases where an aggregation was observed in the tire puncture sealant were evaluated as "x".

Puncture-Sealing Ability

A puncture hole (diameter: 4 mm) was made in the shoulder groove portion of the tread of a tire.

Then, the tire with the puncture hole was mounted on a drum tester, the obtained tire puncture sealant was injected via the valve, and the tire was inflated with air to an internal pressure of 200 kPa.

Thereafter, intermittent running cycles in which the tire was run for 1 minute and then stopped under a load of 350 kg and at a speed of 30 km/hr were performed. After stopping the running, the tire was visually observed and evaluated by spraying soapy water around the puncture hole. The intermittent running and stopping thereafter were repeated until air leakage ceased.

When evaluating the results of this procedure, the sealing performance was evaluated as "extremely excellent" ("⊚") if air leakage ceases after carrying out the intermittent running from 1 to 10 times, "excellent" ("○") if air leakage ceases after carrying out the intermittent running from 11 to 15 times, and "poor" ("x") if air leakage has not ceased after carrying out the intermittent running 16 or more times.

TABLE 3

| Table 3 | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| | | Comparative Examples | | Working Examples | | | | Comparative Example | | | Working Examples | | | | |
| NR latex (solid content) | Hytex HA | 50 | 50 | 50 | 50 | 50 | 50 | 50 | 50 | 50 | 50 | 50 | 50 | 50 | 50 |
| Cationic polymer (solid content) | Polymerization Example 1 | | 5 | | | | | | | | | | | | |
| | 2 | | | 5 | | | | | | | | | | | |
| | 3 | | | | 5 | | | | | | | | | | |
| | 4 | | | | | 5 | | | | | | | | | |
| | 5 | | | | | | 5 | | | | | | | | |
| | 6 | | | | | | | | 5 | | | | | | |
| | 7 | | | | | | | | | 5 | | | | | |
| | 8 | | | | | | | | | | 5 | | | | |
| | 9 | | | | | | | | | | | 5 | | | |
| | 10 | | | | | | | | | | | | 5 | | |

TABLE 3-continued

| | | Blending Examples | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| | | Working Example/Comparative Example | | | | | | | | | | | | | |
| Table 3 | | Comparative Examples | | Working Examples | | | | Comparative Example | Working Examples | | | | | | |
| | 11 | | | | | | | | | | | | | 5 | |
| | 12 | | | | | | | | | | | | | | 5 |
| | 13 | | | | | | | | | | | | | | 5 |
| Cationic natural rubber latex | Viscosity (@20° C., mPa·s) | 210 | 350 | 420 | 400 | 380 | 380 | 600 | 350 | 310 | 330 | 320 | 340 | 330 | 320 |
| | Surface potential (mV) | −45.0 | −2.5 | −16.5 | −19.9 | −17.8 | −21.5 | −23.0 | −21.2 | −22.6 | −19.5 | −21.9 | −21.4 | −18.7 | −19.0 |
| | | Acidic resin emulsion (solid content) | | | | | | | | | | | | | |
| EVA Em1 | S-408HQ | 50 | 50 | 50 | 50 | 50 | 50 | 50 | | | | 50 | | 50 | 50 |
| EVA Em2 | S-400HQ | | | | | | | | 50 | | 50 | | | | |
| EVA Em3 | S-950HQ | | | | | | | | | 50 | | | 50 | | |
| Anti-freezing agent 1 | EG | | 250 | 250 | | | | | | 150 | 150 | 250 | ← | ← | ← |
| Anti-freezing agent 2 | PG | 250 | | | 250 | | | 150 | 250 | 100 | 100 | | | | |
| Anti-freezing agent 3 | GLy | | | | | 250 | | 100 | | | | | | | |
| Anti-freezing agent 4 | DEG | | | | | | 250 | | | | | | | | |
| Amount of antifreezing agent per 100 parts by weight of solid content | | 250 | 238 | ← | ← | ← | ← | ← | ← | ← | ← | ← | ← | ← | ← |
| Tire puncture sealant | Solid content (mass %) | 31 | 31 | 30.5 | 31.5 | 31.2 | 30.4 | 30.6 | 30.7 | 31.1 | 31.5 | 31.4 | 31 | 31.4 | 31.5 |
| | | Tire puncture sealant evaluation | | | | | | | | | | | | | |
| Safety | pH | 9.5 | 8 | 7.5 | 7.5 | 6.7 | 5.1 | 4.7 | 7.2 | 5.4 | 4.6 | 7.2 | 4.7 | 8.5 | 4.7 |
| Workability | Viscosity at −40° C. (mPa·s) | 4300 | 1300 | 1000 | 1200 | 900 | 1100 | 1550 | 1150 | 1200 | 1200 | 950 | 1000 | 1050 | 1200 |
| | Squeezability by hand | x | ○ | ○ | ○ | ○ | ○ | x | ○ | ○ | ○ | ○ | ○ | ○ | ○ |
| Storage stability | (vibration test at 80° C.) | x | x | ○ | ○ | ○ | ○ | ○ | ○ | ○ | ○ | ○ | ○ | ○ | ○ |
| Sealing ability | | ○ | ○ | ○ | ○ | ○ | ○ | ○ | ○ | ○ | ○ | ○ | ○ | ○ | ○ |

TABLE 4

| | | Blending Examples | | | | | | |
|---|---|---|---|---|---|---|---|---|
| | | 15 | 16 | 17 | 18 | 19 | 20 | 21 |
| | | Working Example/Comparative Example | | | | | | |
| Table 4 | | Working Examples | | Comparative Examples | | | Working Examples | |
| NR latex (solid content) | Hytex HA | 50 | ← | ← | ← | ← | ← | ← |
| Cationic polymer (solid content) | Polymerization Example 14 | 5 | | | | | | |
| | 15 | | 5 | | | | | |
| | 16 | | | 5 | | | | |
| | 17 | | | | 5 | | | |

TABLE 4-continued

|  |  |  |  |  |  |  |  |  |
|---|---|---|---|---|---|---|---|---|
| | 18 | | | | | 5 | | |
| | 19 | | | | | | 5 | |
| | 20 | | | | | | | 5 |
| | 21 | | | | | | | |
| | 22 | | | | | | | |
| | 23 | | | | | | | |
| | 24 | | | | | | | |
| | 25 | | | | | | | |
| | 26 | | | | | | | |
| | Stearyl trimethyl ammonium chloride | | | | | | | |
| Cationic natural rubber latex | Viscosity (@20° C., mPa · s) | 330 | 360 | 550 | 350 | 370 | 350 | 440 |
| | Surface potential (mV) | −22.2 | −18.7 | −18.6 | −19.7 | −21.4 | −22.1 | −23.1 |
| Acidic resin emulsion (solid content) | | | | | | | | |
| EVA Em1 | S-408HQ | 50 | ← | ← | ← | | | |
| EVA Em2 | S-400HQ | | | | | 50 | ← | ← |
| EVA Em3 | S-950HQ | | | | | | | |
| Antifreezing agent 1 | EG | 120 | ← | ← | ← | ← | ← | ← |
| Antifreezing agent 2 | PG | 130 | ← | ← | ← | ← | ← | ← |
| | Amount of antifreezing agent per 100 parts by weight of solid content | 238 | ← | ← | ← | ← | ← | ← |
| Tire puncture sealant evaluation | | | | | | | | |
| Tire puncture sealant | Solid content (mass %) | 29.5 | 29.3 | 30.5 | 29.5 | 29.1 | 30.1 | 30.2 |
| Safety | pH | 6.5 | 6 | 7.1 | 6.8 | 6.5 | 7.1 | 6.7 |
| Workability | Viscosity at −40° C. (mPa · s) | 1000 | 1450 | 1600 | 1050 | 960 | 1010 | 1300 |
| | Squeezability by hand | ○ | ○ | x | ○ | ○ | ○ | ○ |
| Storage stability | (vibration test at 80° C.) | ○ | ○ | ○ | x | ○ | ○ | ○ |
| Sealing ability | | ○ | ○ | ○ | ○ | ○ | ○ | ○ |

|  |  | Blending Examples | | | | | | |
|---|---|---|---|---|---|---|---|---|
| | | 22 | 23 | 24 | 25 | 26 | 27 | 28 |
| | | Working Example/Comparative Example | | | | | | |
| Table 4 | | Comparative Examples | | Working Example | | Comparative Examples | | |
| NR latex (solid content) | Hytex HA | ← | ← | ← | ← | ← | ← | ← |
| Cationic polymer (solid content) | Polymerization Example 14 | | | | | | | |
| | 15 | | | | | | | |
| | 16 | | | | | | | |
| | 17 | | | | | | | |
| | 18 | | | | | | | |
| | 19 | | | | | | | |
| | 20 | | | | | | | |
| | 21 | 5 | | | | | | |
| | 22 | | 5 | | | | | |
| | 23 | | | 5 | | | | |
| | 24 | | | | 5 | | | |
| | 25 | | | | | 5 | | |
| | 26 | | | | | | 5 | |
| | Stearyl trimethyl ammonium chloride | | | | | | | 0.25 |
| Cationic natural rubber latex | Viscosity (@20° C., mPa · s) | 570 | 340 | 350 | 560 | 710 | 1030 | 150 |
| | Surface potential (mV) | −18.9 | −20.5 | −19.3 | −22.2 | −22.1 | −18.9 | −5.5 |
| Acidic resin emulsion (solid content) | | | | | | | | |
| EVA Em1 | S-408HQ | | | | | | | |
| EVA Em2 | S-400HQ | ← | | | | | | |
| EVA Em3 | S-950HQ | | 50 | ← | ← | ← | ← | |

TABLE 4-continued

| | | | | | | | | |
|---|---|---|---|---|---|---|---|---|
| Antifreezing agent 1 | EG | ← | ← | ← | ← | ← | ← | |
| Antifreezing agent 2 | PG | ← | ← | ← | ← | ← | ← | 100 |
| Amount of antifreezing agent per 100 parts by weight of solid content | | ← | ← | ← | ← | ← | ← | 100 |
| Tire puncture sealant evaluation | | | | | | | | |
| Tire puncture sealant | Solid content (mass %) | 29.6 | 29.4 | 29.1 | 29.1 | 29 | 29.3 | 33.3 |
| Safety | pH | 6.7 | 5.7 | 5.9 | 5.7 | 5.7 | 5.7 | 6.5 |
| Workability | Viscosity at −40° C. (mPa · s) | 2600 | 1000 | 1030 | 2900 | 2700 | 3010 | 4500 |
| | Squeezability by hand | x | ○ | ○ | x | x | x | x |
| Storage stability | (vibration test at 80° C.) | ○ | x | ○ | ○ | ○ | ○ | x |
| Sealing ability | | ○ | ○ | ○ | ○ | ○ | ○ | ○ |

The details of each component shown in the above tables are as follows.
  NR latex: natural rubber latex, trade name: Hytex HA, manufactured by Nomura Trading Co., Ltd., solid content: 60% by mass
  Cationic polymer: cationic polymers obtained by Polymerization Examples 1 to 26 described above
  Stearyl trimethyl ammonium chloride: reagent
  EVA Em1: ethylene-vinyl acetate copolymer emulsion, trade name: S-408HQ, manufactured by Sumitomo Chemical Co., Ltd., pH: 5.5
  EVA Em2: ethylene-vinyl acetate copolymer emulsion, trade name: S-400HQ, manufactured by Sumitomo Chemical Co., Ltd., pH: 5.5
  EVA Em3: ethylene-vinyl acetate copolymer emulsion, trade name: S-950HQ, manufactured by Sumitomo Chemical Co., Ltd., pH: 5.5
  Antifreezing agent 1 EG: ethylene glycol, manufactured by Wako Pure Chemical Industries, Ltd.
  Antifreezing agent 2 PG: propylene glycol, manufactured by Sankyo Kagaku Yakuhin Co., Ltd.
  Antifreezing agent 3 GLy: glycerin, manufactured by Wako Pure Chemical Industries, Ltd.
  Antifreezing agent 4 DEG: diethylene glycol, manufactured by Wako Pure Chemical Industries, Ltd.

As is clear from the results shown in Tables 1 to 4, Blending Example 1 in which the natural rubber latex that was not coated with a cationic polymer was used exhibited inferior workability and storage stability. Blending Example 2 in which cationic natural rubber latex having the surface potential of the cationic natural rubber microparticles of greater than −3 mV was used exhibited inferior storage stability. Blending Example 7 in which the cationic natural rubber latex having the viscosity at 20° C. of greater than 500 mPa·s was used had high viscosity at −40° C. and exhibited inferior workability. Blending Examples 17, 22, and 25 to 27 in which the cationic natural rubber latexes that had the viscosity at 20° C. of greater than 500 mPa·s and that were coated with cationic polymers having the weight average molecular weights of greater than 150,000 were used exhibited inferior workability. Blending Examples 18 and 23 in which the cationic natural rubber latexes coated with cationic polymers having the weight average molecular weights of less than 3000 were used exhibited inferior storage stability. Blending Example 28 in which a cationic low molecular weight surfactant was used instead of cationic natural rubber latex was used exhibited inferior workability and storage stability.

On the other hand, working examples had low viscosities at −40° C. and thus exhibited excellent workability since working examples were easily squeezed by hand. Working examples also exhibited high sealing performance, and were highly safe because the pH values were almost neutral.

Therefore, the tire puncture sealant of the present invention has low viscosity at −40° C. and thus exhibits excellent workability since the tire puncture sealant is easily squeezed by hand. The tire puncture sealant also exhibits high sealing performance, and is highly safe because the pH value is almost neutral.

What is claimed is:

1. A cationic natural rubber latex comprising cationic natural rubber microparticles in which surfaces of natural rubber microparticles are coated by a cationic polymer,
   a weight average molecular weight of the cationic polymer being from 3000 to 150000,
   a concentration of the cationic natural rubber being from 30 to 70% by mass,
   a viscosity at 20° C. being from 50 mPa·s to 500 mPa·s, and
   a surface potential of the cationic natural rubber microparticles being −3 mV to −50 mV, and
   the amount of the cationic polymer that is used is from 1 to 15 parts by mass per 100 parts by mass, in terms of solid content, of the natural rubber latex.

2. The cationic natural rubber latex according to claim 1, wherein the cationic polymer is a polyurethane having a cationic group and/or a salt thereof.

3. The cationic natural rubber latex according to claim 1, wherein the cationic polymer has a cationic group and/or a salt, and
   a monomer used for introducing the cationic group is from 5 to 50 mol % of a total amount of monomers used in a production of the cationic polymer.

4. A tire puncture sealant comprising: the cationic natural rubber latex described in claim 1; and an acidic resin emulsion, a mass ratio of a solid content of the cationic natural rubber latex to a solid content of the acidic resin emulsion being from 90:10 to 10:90.

5. The tire puncture sealant according to claim 4, wherein the acidic resin emulsion is an ethylene-vinyl acetate copolymer emulsion.

6. The tire puncture sealant according to claim 4, wherein a total of the solid content of the cationic natural rubber latex and the solid content of the acidic resin emulsion is from 20 to 40% by mass of a total mass of the tire puncture sealant.

7. The tire puncture sealant according to claim 4, further comprising an antifreezing agent, wherein an amount of the antifreezing agent is from 160 to 400 parts by mass per 100 parts by mass total of a solid content of the natural rubber latex and the solid content of the acidic resin emulsion.

8. The tire puncture sealant according to claim 7, wherein the antifreezing agent is one type or two or more types selected from the group consisting of ethylene glycol, propylene glycol, glycerin, and diethylene glycol.

9. The tire puncture sealant of claim 4 wherein the viscosity of the sealant at −40° C. is 1500 mPa·s or less.

* * * * *